United States Patent

Klein et al.

[11] 3,883,795
[45] May 13, 1975

[54] ELECTRONIC IGNITION ANGLE MEASURING APPARATUS

[75] Inventors: Erwin Klein; Herbert Lucke, both of Regensburg, Germany

[73] Assignee: Siemens Aktiengesellschaft, Munich, Germany

[22] Filed: Mar. 14, 1973

[21] Appl. No.: 341,141

[30] Foreign Application Priority Data
Mar. 16, 1972 Germany............................ 2212813

[52] U.S. Cl............. 324/16 R; 324/16 T; 324/83 A
[51] Int. Cl............................................ F02p 17/00
[58] Field of Search........ 324/15, 16 R, 16 T, 83 A; 73/116 T, 119 A

[56] References Cited
UNITED STATES PATENTS

| | | | |
|---|---|---|---|
| 3,454,871 | 7/1969 | Nolting | 324/16 T |
| 3,593,131 | 7/1971 | Mittel | 324/83 A |

Primary Examiner—Michael J. Lynch
Attorney, Agent, or Firm—Kenyon & Kenyon Reilly Carr & Chapin

[57] ABSTRACT

An electronic ignition angle measuring apparatus for an electronic ignition system including a first pulse generator which generates ignition pulses which are transmitted to a distributor of the internal combustion engine, and a second pulse generator which generates pulses at a frequency which depends upon the speed of rotation of the engine. A control circuit coupled to the pulse generators controls a pair of counters driven by a signal generator by means of switches coupled thereto. A signal divider coupled to the counters divides the output signals generated thereby and generates an output signal which is representative of the ignition angle measured. This output signal is transmitted to an indicator coupled to the divider which visually indicates the measured ignition angle.

5 Claims, 17 Drawing Figures

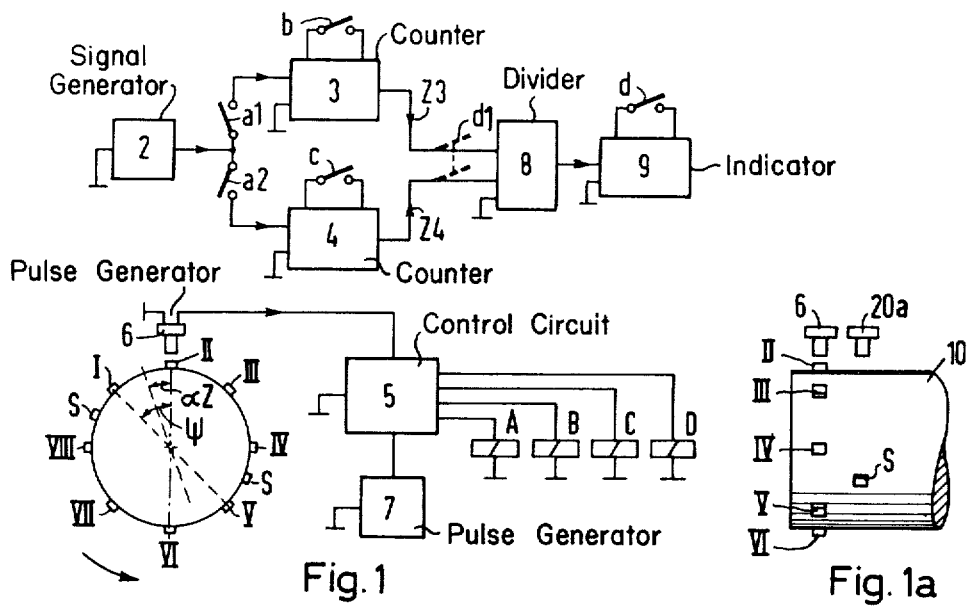
Fig. 1
Fig. 1a
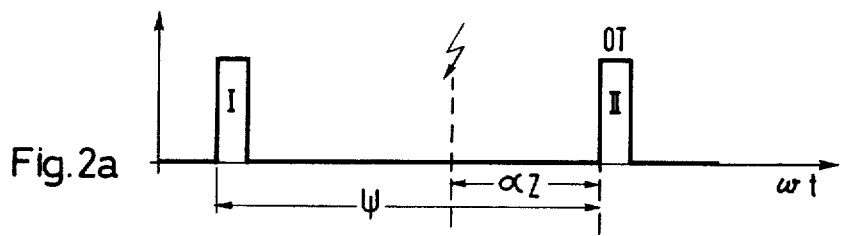
Fig. 2a
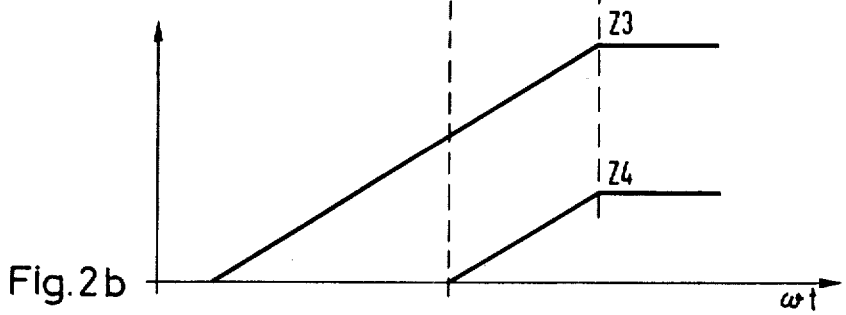
Fig. 2b
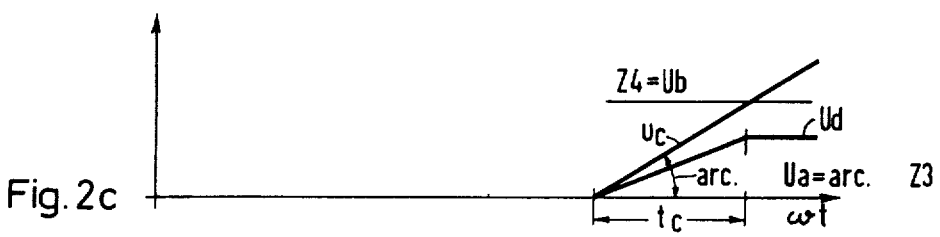
Fig. 2c 3,883,795

1

ELECTRONIC IGNITION ANGLE MEASURING APPARATUS

BACKGROUND OF THE INVENTION

The invention relates to an electronic ignition angle measuring apparatus for an internal combustion engine, and in particular, to an ignition angle measuring apparatus for an ignition system including a first pulse generator which generates and transmits ignition pulses to the distributor of the engine, and a second pulse generator which generates pulses at a frequency which depends upon the speed of rotation of the engine.

SUMMARY OF THE INVENTION

It is an object of the invention to provide an apparatus for measuring the ignition angle of an electronic ignition system whose systematic measuring error is significantly reduced.

It is also an object of the invention to provide an apparatus for measuring the ignition angle of an electronic ignition system which does not require that the exact speed of the engine be measured.

It is still a further object of the invention to provide a rapidly operating electronic ignition angle measuring apparatus.

Accordingly, the invention provides an electronic ignition angle measuring apparatus for an internal combustion engine, including a first ignition pulse generator coupled to the distributor of the engine for generating ignition pulses, and a second pulse generator for generating pulses at a frequency which depends upon the speed of rotation of the engine, comprising signal generating means; first and second signal summing means, coupled and responsive to the signal generating means; control means, coupled to the signal generating means, the first and second summing means, and to the first and second pulse generators, and responsive to the pulses generated by the first and second pulse generating means for controlling the first and second summing means; signal dividing means, coupled to the first and second summing means for generating a signal representative of the ignition angle measured; and means, coupled to the signal dividing means, and responsive to the signal generated thereby, for indicating the ignition angle measured. Direct indication of the ignition angle is obtained by using the control means to deactivate the summing means simultaneously in response to one of the pulses generated by the speed dependent pulse generator. Furthermore, extremely accurate measurement of the ignition angle is achieved since the rotation engine speed measured by the apparatus approaches the instantaneous value thereof at the moment the first ignition pulse generator transmits an ignition spark pulse to the distributor of the engine. Similar results are obtained by using either analog or digital components in the apparatus.

BRIEF DESCRIPTION OF THE DRAWINGS

FIG. 1 is a block diagram of an electronic ignition angle measuring apparatus constructed according to the invention;

FIG. 1a is a partial side view of an embodiment of a speed dependent pulse generator used in conjunction with the apparatus of FIG. 1;

2

Figure 3:
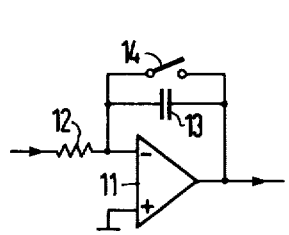
Figure 4:
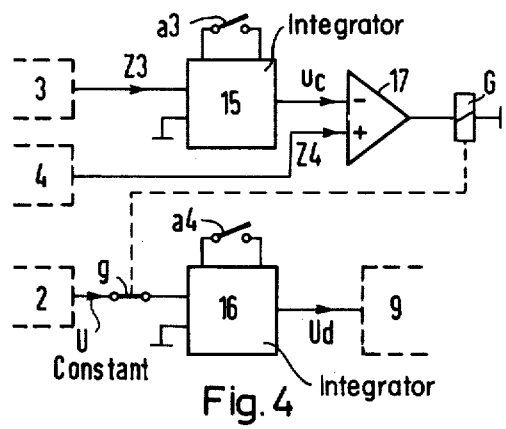
Figure 5:
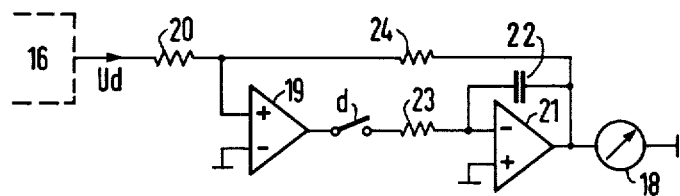
Figure 6:
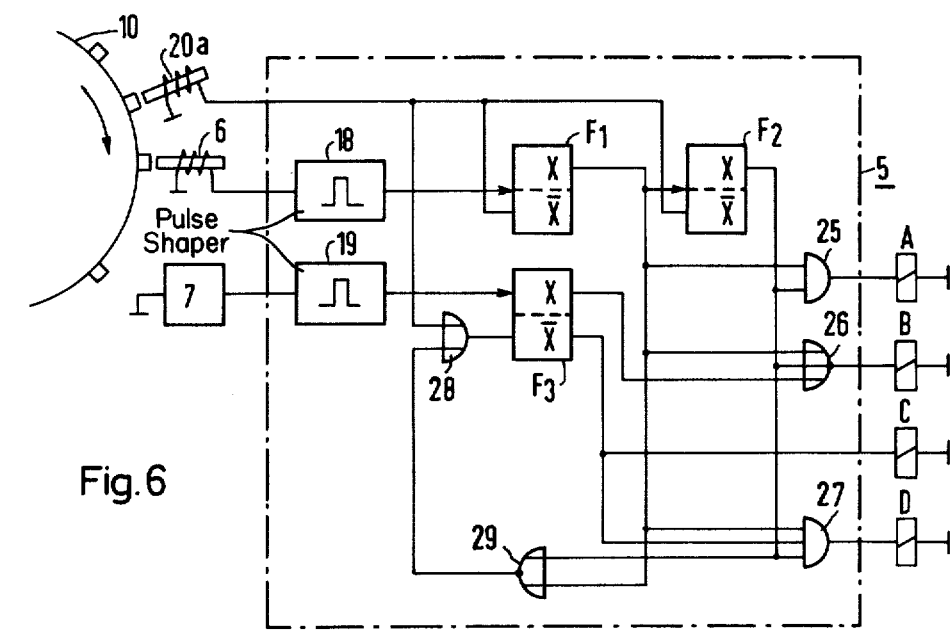

FIG. 2a is a graphical illustration showing the pulse train generated by the speed dependent pulse generator of the apparatus;

FIG. 2b is a graphical illustration showing the output signals generated by the counters of the apparatus;

FIG. 2c is a graphical illustration showing the signals generated by the signal divider of the apparatus;

FIG. 3 is a schematic diagram of one embodiment of a counter of the measuring apparatus constructed according to the invention;

FIG. 4 is a schematic diagram of one embodiment of a signal divider of the measuring apparatus constructed according to the invention;

FIG. 5 is a schematic diagram of one embodiment of an indicator of the measuring apparatus constructed according to the invention;

FIg. 6 is a schematic diagram of a logic control circuit of the measuring apparatus constructed according to the invention;

FIG. 7a is a graphical illustration of the pulse train generated by the speed dependent pulse generator of the measuring apparatus of the invention;

FIG. 7b is a graphical illustration of the pulse train generated in response to the pulse train illustrated in FIG. 7a, at the output X of the flip-flop F1 of the logic circuit illustrated in FIG. 6;

FIG. 7c is a graphical illustration of the pulse train generated in response to the pulse train illustrated in FIG. 7b, at the output X of the flip-flop F2 of the logic circuit illustrated in FIG. 6;

FIG. 7d is a graphical illustrated of the waveform of the output voltage signal of one of the counters of the measuring apparatus illustrated in FIG. 1;

FIG. 7e is a graphical illustration of the pulse train generated at the output X of flip-flop F3 in response to the ignition pulses generated by the first pulse generator;

FIG. 7f is a graphical illustration of the waveform of the output voltage signal of the other counter of the apparatus illustrated in FIG. 1;

FIG. 7g is a graphical illustration of the waveform of the output voltage signal of one of the integrators of the embodiment of the signal divider illustrated in FIG. 4; and FIG. 7h is a graphical illustration of the waveform of the output voltage signal of the other integrator of the embodiment of the signal divider illustrated in FIG. 4.

In the drawings, similar reference numerals are used to denote similar elements throughout the several views thereof.

DETAILED DESCRIPTION

It is to be understood that the embodiment of the invention shown in the accompanying drawings and described in the following detailed description is an illustrative example only, and it is not intended that the drawings and detailed description comprise a definition of the limits and scope of the invention disclosed herein.

Referring now to the drawings, specifically FIGS. 1 and 1a, there is shown a rotatable cylinder 10 which is coupled to the crankshaft or flywheel of an internal combustion engine whose ignition angle is to be measured. Cylinder 10 has a plurality of magnetic pins I-VIII disposed on its outer surface, each of which is positioned in the same cross-sectional plane of cylinder 10, and spaced apart from adjacent pins by equal circumferential distances. A pair of additional magnetic pins S are also disposed on the outer surface of cylinder 10, in another cross-sectional plane thereof, at opposite ends of a diameter of the cylinder.

A first pulse generating means, illustrated as induction coil 6, is disposed adjacent cylinder 10 in the same plane as magnetic pins I–VIII. The magnetic field of each pin generates a pulse as it is moved past induction coil 6 during rotation of the cylinder. The frequency of the generation of pulses by the pins and induction coils 6 depends upon the speed of rotation of the crankshaft or flywheel of the engine to which cylinder 10 is coupled. Induction coil 6 is coupled to a second pulse generating means, shown as ignition pulse generator 7, which may be, for example, either the interrupter (breaker arm) of the engine, or an ignition coil which is inductively coupled to the distributor thereof. Each time an ignition pulse, i.e., a spark, is transmitted to the distributor of the engine by pulse generator 7, a similar pulse is transmitted to the measuring apparatus.

The apparatus for measuring the ignition angle is illustrated in FIG. 1, and comprises a signal generating means coupled to a pair of electronic summing means, illustrated as counters 3 and 4. The signal generating means is shown as signal generator 2, and is coupled to each of the counters by a control means, which includes logic control circuit 5 and first and second switches a1 and a2, which are coupled to and controlled by control circuit A. Switches a1 and a2 may each comprise, for example, a relay switch, and control circuit A may comprise the relay coil of the relay. Alternatively, the switches may comprise field effect transistors, in which case the control circuit of each would consist of known electronic circuitry for controlling the transistors.

Each of counters 3 and 4 is provided with a control switch which comprises part of the control means, shown as switch b coupled to counter 3 and switch c coupled to counter 4. These switches are controlled by control circuits B and C, respectively, and may also comprise relay switches or field effect transistors.

Counters 3 and 4 are coupled to an electronic signal dividing means, shown as signal divider 8, and means for indicating the measured ignition angle of the engine, shown as indicator 9. The indicator includes a transfer switching means, shown as switch d, which is controlled by control circuit D. The transfer switching means may comprise a suitable relay or field effect transistor switching circuit.

One embodiment of an electronic analog device which may be utilized as the electronic counter of the measuring apparatus is illustrated in FIG. 3. The counter comprises an analog integrator consisting of an operational amplifier 11, having a series resistor 12 coupled to the negative input terminal thereof, and a feedback capacitor 13 coupled to the negative input terminal and the output terminal of the amplifier. Switch 14, which represents switches b and c of counters 3 and 4, is shunted across capacitor 13, and controls the integrator. When such analog integrators are used in the measuring apparatus, the signal generator preferably comprises a constant voltage signal generator. The integrators then function as constant voltage integrators.

One embodiment of the signal dividing means is shown in FIG. 4. The signal divider comprises a pair of analog integrators 15 and 16, coupled to counter 3 and signal generator 2, respectively, of the type illustrated in FIG. 3. Counter 3 is coupled to the negative input terminal of integrator 15. The latter includes a switch a3, shunted across the negative input terminal and output terminal thereof, which controls the integrator. The output terminal of the integrator is also coupled to the negative terminal of a voltage comparator 17, which may comprise, for example, a differential amplifier. The positive input terminal of comparator 17 is coupled directly to the output terminal of counter 4. A control circuit G, which controls switch g, is coupled and responsive to comparator 17. Control circuit G and switch g and electrically separate integrators 15 and 16 may also comprise a relay or a field effect transistor circuit. Switch g couples signal generator 2 to the negative input terminal of integrator 16, which includes switch a4 which functions in a manner similar to switch a3 in integrator 15. Switches a3 and a4 are controlled by control circuit A, and comprise part of the switching means of the apparatus.

The output terminal of integrator 16 is coupled to indicator 9, one embodiment of which is illustrated in FIG. 5. The analog components of the indicator comprise an operational amplifier 19 having the positive input terminal 12 thereof coupled to the output terminal of integrator 16 by a series resistor 20. Transfer switch d couples the output terminal of amplifier 19 to the negative input terminal of an operational amplifier 21 through a low resistance series resistor 23. Feedback capacitor 22 is shunted across the negative input terminal and the output terminal of amplifier 21, and causes amplifier 21 to function as an integrator. Resistor 24 couples the positive input terminal of amplifier 19 and the output terminal of integrator 16 to the output terminal of amplifier 21. A D'Arsonval mechanism 18, responsive to the current output of operational amplifier 21 and integrater 16, is coupled to both the output terminal of amplifier 21 and to the output terminal of integrator 16. Amplifier 19 and 21 and their associated circuit components comprise a sample and hold data circuit which stores the signal representing the ignition angle measured.

One embodiment of the logic control circuit 5 is illustrated in FIG. 6. The circuit comprises a frequency divider consisting of a pair of bistable flip-flops F1 and F2 which are coupled to each other in series. The set input terminal, i.e., the dynamic input, of flip-flop F1 is coupled to induction coil 6 by a first pulse shaping means, shown as pulse shaper 18. The set input terminal of a third bistable flip-flop F3, which is associated with the output X, is coupled by a second pulse shaping means, shown as pulse shaper 19, to the output terminal of pulse generator 7.

Control circuit A is coupled to the output terminal of an AND gate 25, which has one of each of its two input terminals coupled to the outputs X of first and second flip-flops F1 and F2. Control circuit B is coupled to the output terminal of an inverter stage, which includes a NOR gate 26 having its three input terminals coupled to the outputs X of flip-flops F1, F2 and F3. Control circuit C is coupled directly to the inverted output X̄ (i.e., not X) of flip-flop F3. Control circuit D is coupled to another AND gate 27 which has two of the three input terminals thereof coupled to the X outputs of flip-flops F1 and F2, and the third input terminal thereof coupled to the inverted output X̄ of flip-flop F3.

Means for synchronizing the outputs of bistable flip-flops F1, F2 and F3 is also illustrated in FIG. 6. The synchronizing means comprises a pair of magnetic pins S, disposed as previously described on the outer surface of cylinder 10, and an additional induction coil 20a, shown in both FIG. 1a and FIG. 6, disposed adjacent magnetic pins S. The magnetic pins S are located in cross-sectional plane of cylinder 10 which is parallel to the plane thereof in which magnetic pins I–VIII are disposed. The additional pins are spaced apart by an angle of 180°, and lie at opposite ends of a diameter of cylinder 10. The magnetic pins S are also positioned on generatrices of cylinder 10 which are located between magnetic pins IV and V, and pins VIII and I, respectively. Induction coil 20a is disposed in the same cross-sectional plane of cylinder 10 as pins S, and adjacent induction coil 6 along a line passing through coil 6 which is parallel to the longitudinal axis of cylinder 10.

The output terminal of induction coil 20a is coupled to the reset input terminals, associated with the inverted output $\bar{X}$, of flip-flops F1 and F2, and to one input terminal of an OR gate 28 whose output terminal is coupled to the clearing input terminal of flip-flop F3. The other input terminal of gate 28 is connected to the output terminal of the inverter stage, which further includes a second NOR gate 29 whose two input terminals are coupled to the outputs of flip-flops F1 and F2.

The operation of the apparatus heretofore described will now be explained with reference to FIGS. 2a–2c and FIG. 7:

In the following description, in order to simplify the explanation of the operation of the invention, the internal combustion engine whose ignition angle is being measured will be assumed to be a four cylinder engine having its ignition timing advanced with respect to top dead center. It should be noted, however, that the apparatus may be used to measure the ignition angle of any internal combustion engine, utilizing either advanced or retarded ignition timing.

If the engine is assumed to be a four cylinder internal combustion engine, then whenever a pair of the pistons thereof are disposed at top dead center, either magnetic pin II or VI, depending upon the piston pair, is disposed opposite induction coil 6. If it is assumed that advanced ignition timing is used in the engine, the ignition angle $\alpha_z$ lies within a separation angle $\psi$ which represents the angular distance between magnetic pins I and II. For reference purposes, cylinder 10 is taken to rotate in a counterclockwise direction, as indicated by the arrow in FIG. 1.

As cylinder 10 is rotated by the engine, magnetic pins I–VIII are moved passed induction coil 6, and generate the series of pulses illustrated in FIG. 7a, with each being designated as pulses I–VIII corresponding to the magnetic pin generating the pulse. Top dead center of the cylinders is indicated in the pulse train by the reference numerals OT disposed above the pulses at which top dead center occurs. When magnetic pin I, as well as each of the other magnetic pins, passes induction coil 6, a pulse shown as pulse I in FIG. 2a is generated. The amplitude of the pulse generated is plotted in the drawings with respect to $\omega t$, wherein $\omega$ represents the angular velocity of cylinder 10, and $t$ represents time. The pulse generated in induction coil 6 is transmitted to pulse shaper 18 in logic circuit 5. Initially, before the engine is operated, there is no output from logic circuit 5 since there is no input thereto, and switches a1 and a2 are open, and switches b and c are closed. Switches a1 and a2 are closed by the pulse, and switch b is opened. Switch c remains closed. The pulse train generated by the plurality of magnetic pins passing induction coil 6 is illustrated in FIG. 7a. This pulse train produces the pulse trains shown in each of FIGS. 7b, 7c and 7e, at the outputs X of flip-flops F1, F2 and F3, respectively. The pulses appearing at the output terminals of flip-flops F1 and F2 in response to pulse I cause AND gate 25 to generate an output signal and cuase control circuit A to close switches a1 and a2, and control circuit B to open switch b. Since there is no output at output terminal X of flip-flop F3 until the ignition spark occurs, control circuit C is not activated and switch c remains closed. Counter 3 then begins to count, i.e., integrate the constant voltage signal transmitted thereto by signal generator 2. Its output signal Z3 is shown in FIG. 2b, plotted with respect to $\omega t$. When cylinder 10 rotates completely through the angular distance $\Psi - \alpha_z$, ignition occurs, and pulse generator 7 transmits a pulse to pulse shaper 19 of logic control circuit 5. The pulse illustrated in FIG. 7e then appears at output X of flip-flop F3. Flip-flop F3 is set by the pulse transmitted thereto, and no output appears at output $\bar{X}$. This deactivates control circuit C and opens switch c. Counter 4 then begins to count. Its output signal Z4 is illustrated in FIG. 2b, plotted with respect to $\omega t$. As cylinder 10 continues to rotate, magnetic pin II passes induction coil 6, and pulse II illustrated in FIG. 2a, is generated. The corresponding pulses illustrated in FIG. 7b, 7c and 7e then appear at the outputs X of flip-flops F1, F2 and F3, respectively, and control circuit A opens switches a1 and a2. The operation of counters 3 and 4 is thus interrupted, and the final values of the signals are stored in counters 3 and 4, as illustrated in FIG. 2b. Then final values are divided by signal divider 8, which generates an output signal U$d$ which is representative of the ignition angle measured.

If T is designated at the time which expires between the instant magnetic pin I passes induction coil 6 and the instant magnetic pin II passes induction coil 6, during which time cylinder 10 rotates through the angle $\psi$, and $t$ is designated as the time which expires between the instant the ignition spark pulse is generated and the instant magnetic pin II passes induction coil 6, during which time cylinder 10 rotates through the ignition angle $\alpha z$, then:

$$\alpha z / \psi = t/T$$

and:

$$\alpha z = (t/T) \cdot \psi$$

Since the final output voltage values of counters 3 and 4 are proportional to T and $t$, and since $\psi$ is known, the output of divider 8 is proportional to the ignition angle $\alpha_z$.

As cylinder 10 continues to rotate, and the magnetic pin III passes induction coil 6, pulse III shown in FIG. 7a is generated, causing the pulses illustrated in FIGS. 7b, 7c and 7e to be generated at flip-flops F1, F2 and F3, respectively. Transfer pulse 21, illustrated in FIG. 7h, is also generated as pin III passes induction coil 6, and AND gate 27 activates control circuit D and closes switch d for its duration. The voltage output of the divider is then transferred to indicator 9. When magnetic pin IV passes the induction coil, pulse IV is generated, and causes the pulses illustrated in FIGS. 7b, 7c and 7e to appear at the outputs X of flip-flops F1, F2 and F3, respectively, thus closing switches $c$ and $b$, and opening switches $a1$ and $a2$. Magnetic pin V generates pulse V as it passes the induction coil, and the cycle is repeated.

Figure 7:
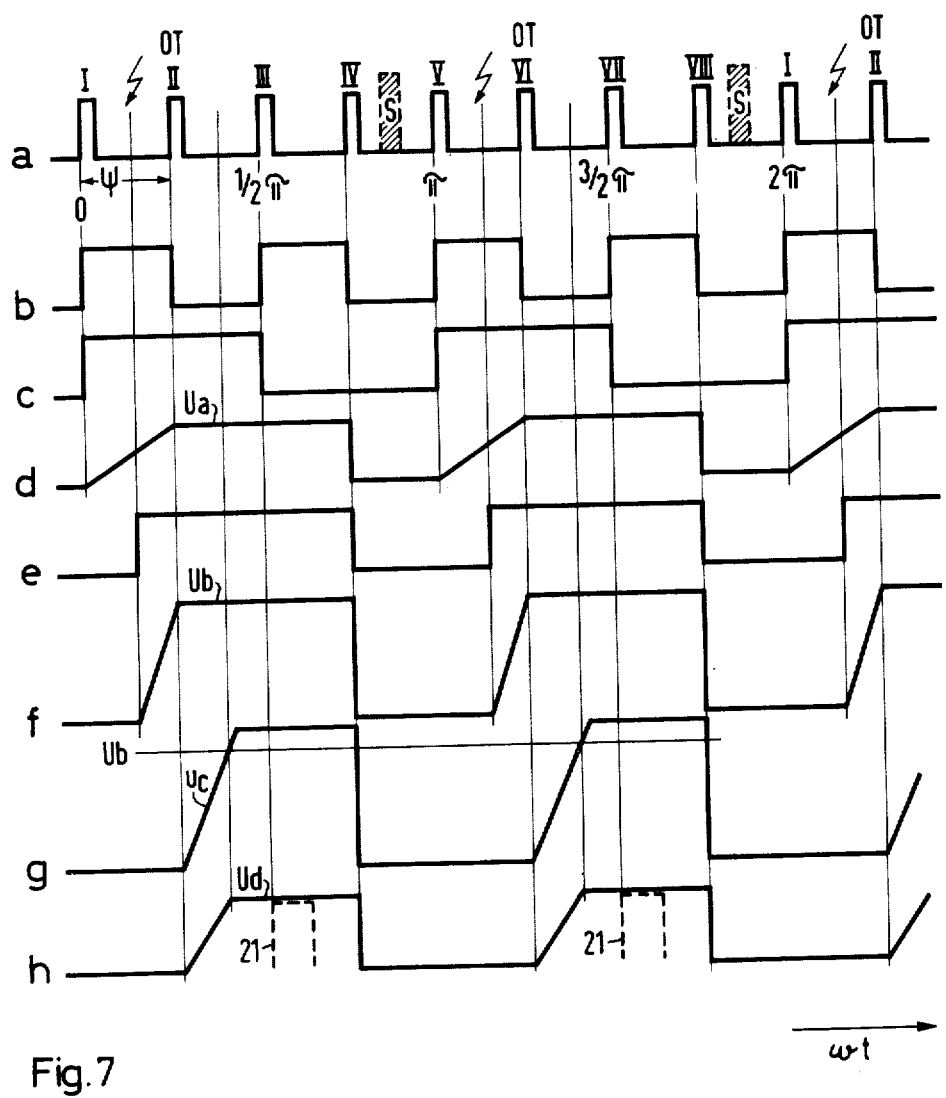

Switches $a3$ and $a4$, shown in FIG. 4, are opened and closed at the same time as switches $a1$ and $a2$. Thus, when pulse II causes the opening of switches $a1$ and $a2$, switches $a3$ and $a4$ are opened simultaneously. Integrator 15 then integrates the final voltage value Z3 of counter 3, which is shown as the signal $U_a$ illustrated in 7d. Simultaneously, integrator 16 begins integration of the voltage signal $U_{constant}$ coupled thereto by signal generator 2. FIG. 7f illustrates the waveform of the output voltage signal Z4, illustrated as signal $U_b$. FIG. 2c graphically illustrates both portions of signals $U_c$ and $U_d$ during the time period in which pulses I and II are generated. FIG. 7g illustrates the waveform of the output voltage signal $U_c$ at the output terminal of integrator 15, and FIG. 7h illustrates the waveform of the output voltage signal $U_d$ of integrator 16. In FIG. 7 h, transfer pulses 21, which are triggered by pulses III and IV, are illustrated in dotted lines. The amplifiers 19 and 21 and their associated components comprise a sample and hold circuit. The voltage $U_d$ is amplified by amplifier 19, and then coupled to amplifier 21 when switch $d$ is closed. Amplifier 21 integrates the signal applied to it up to the maximum value of the signal and stores this value. The signal is then applied to mechanism 18 to visually indicate the angle measured.

If the output voltage $U_c$ at the output terminal of integrator 15 is equal to or greater than the output voltage $U_b$, the output of counter 4, then $Z4 = U_b = K_z t$, wherein $K_z$ is a constant. Furthermore, for the output voltage of integrator 15, the relation is $U_c = K_3 \cdot T \cdot t$, wherein $K_3$ also represents a constant. The output voltage $U_c$ is equal to the final voltage value $Z4 = U_b$ after the integration time $t_c = K4 (t/T) = K_4 (\alpha z/\psi)$ expires. $K_4$ represents a constant. At the end of integration time period $t_c$, control circuit G opens switch $g$, and the final output voltage signal which appears at the output terminal of integrator 16 is given as $U_d = K_5 \cdot t_c = K_6 \cdot \alpha_z$, wherein $K_5$ and $K_6$ represent constants. Thus, the final output voltage at the integrator 16 is proportional to the ignition angle $\alpha_z$. The final output voltage signal $U_d$ is transferred to mechanism 18, and the ignition angle measured is indicated.

Magnetic pins S generate pulses S, illustrated in FIG. 7a, as the pins pass ignition coil 20a. The pulses are transmitted to the reset terminals of flip-flops F1, F2 and F3 and reset them if the flip-flops have not been cleared when the pulses are generated. The pulses ensure that counters 3 and 4, and integrators 15 and 16, are reset after pulses IV and VIII are generated.

Although the components of the apparatus described herein have been illustrated as being analog components, digital components may also be utilized. Counters 3 and 4, may, thus, also be digital counters coupled to a clock generator 2. Similarly, divider 8 and indicator 9 may be a digital divider and a digital indication device. If digital components are utilized, switch d of indicator 9 is a two pole switch $d1$, which is indicated by the dotted lines in FIG. 1. Such a digital device provides the same advantages as the analog device disclosed and described herein.

While there has been disclosed herein what is considered to be a preferred embodiment of the invention, it will be obvious to those persons skilled in the art that various changes and modifications may be made thereunto without departing from the invention, and it is therefore intended in the appended claims to cover all such changes and modifications as fall within the true scope and spirit of the invention.

What is claimed is:

1. An electronic ignition angle measuring apparatus for an internal combustion engine including a first pulse generator coupled to the distributor of the engine for generating ignition pulses, and a second pulse generator for generating pulses at a frequency which depends upon the speed of rotation of the engine and in a predetermined phase relationship with respect to top dead center of the cylinders of the engine comprising:
   signal generating means;
   first and second signal summing means each comprising an analog integrator, coupled and responsive to said signal generating means;
   control means including a logic control circuit, coupled to said signal generating means, said first and second summing means, and to the first and second pulse generators, and responsive to a first pulse signal generated by said second pulse generator prior to the generation of an ignition pulse by said first pulse generator so as to activate one of said summing means, to said ignition pulse generated subsequent to the generation of said first pulse signal so as to activate the other of said summing means, and to a second pulse signal generated by said second pulse generator subsequent to the generation of said first pulse signal within one revolution of the engine crankshaft from the generation of said first pulse signal so as to deactivate both of said first and second summing means, said integrators summing signals transmitted thereto by said signal generating means and said control means, and said control means controlling said summing of said signals;
   signal dividing means, coupled to said first and second summing means, for generating a signal representative of the ignition angle measured, and including a first integrator coupled to one of said first and second summing means, a comparator coupled to said first integrator and to the other one of said first and second summing means, a second integrator, coupled to said signal generating means and to said indicating means, first switching means coupled to said first and second integrators and said logic control circuit, and second switching means coupled to said signal generating means and said second integrator and responsive to said comparator;
   means, coupled to said signal dividing means, and responsive to the signal generated thereby, for indicating the ignition angle measured.

2. The apparatus as recited in claim 1, wherein said indicating means comprises an operational amplifier coupled to said second integrator, a third integrator coupled to said operational amplifier and to said second integrator, and an indicating instrument, coupled and responsive to said third integrator.

3. The apparatus as recited in claim 1, wherein said control means includes at least one switch, coupled to each of said integrators and said signal generating means, and at least one additional switch coupled to the input and output terminals of each of said integrators and said logic control circuit.

4. The apparatus as recited in claim 1, wherein said signal generating means comprises a constant voltage source, and wherein each of said integrators comprise a constant voltage integrator.

5. An electronic ignition angle measuring apparatus for an internal combustion engine including a first pulse generator coupled to the distributor of the engine for generating ignition pulses, and a second pulse generator for generating pulses at a frequency which depends upon the speed of rotation of the engine and in a predetermined phase relationship with respect to top dead center of the cylinders of the engine, comprising;

signal generating means;

first and second signal summing means each comprising an analog integrator, coupled and responsive to said signal generating means;

control means including a logic control circuit, at least one switch, coupled to each of said integrators and said signal generating means, and at least one additional switch coupled to the input and output terminals of each of said integrators and said logic control circuit, said control means being coupled to said signal generating means, said first and second summing means, and to the first and second pulse generators, and being responsive to a first pulse signal generated by said second pulse generator prior to the generation of an ignition pulse by said first pulse generator so as to activate one of said summing means, to said ignition pulse generated subsequent to said first signal so as to activate the other of said summing means, and to a second pulse signal generated by said second pulse generator subsequent to the generation of said first pulse signal within one revolution of the engine crankshaft from the generation of said first pulse signal so as to deactivate both of said first and second summing means, said integrators summing signals transmitted thereto by said signal generating means and said control means, and said control means controlling said summing of said signals, said logic control including a first pulse shaping means coupled to said second pulse generator, and first and second bistable flip-flops coupled in series to said first pulse shaping means, and second pulse shaping means coupled to said first pulse generator, and a third bistable flip-flop coupled to said second pulse shaping means, said flip-flops being coupled to said switches coupled to said integrators for controlling said integrators;

signal dividing means, coupled to said first and second summing means, for generating a signal representative of the ignition angle measured; and means, coupled to said signal dividing means, and responsive to the signal generated thereby, for indicating the ignition angle measured.

* * * * *